United States Patent
Johnson et al.

(10) Patent No.: US 6,275,327 B1
(45) Date of Patent: Aug. 14, 2001

(54) ALL-OPTICAL PULSE GENERATING AND AMPLIFYING SYSTEM

(75) Inventors: John L. Johnson; William A. Friday, both of Huntsville, AL (US); Gary L. Wood, Ellicott City, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/272,535

(22) Filed: Mar. 22, 1999

(51) Int. Cl.[7] ................................................ H01S 3/10
(52) U.S. Cl. .................................... 359/336; 372/30
(58) Field of Search ............................. 372/6, 21, 30; 359/333, 336, 341.1, 342, 341.2, 341.3, 341.31, 341.32, 341.33, 341.4, 341.41, 341.42, 341.43, 341.44, 341.5

(56) References Cited

U.S. PATENT DOCUMENTS

| | | | |
|---|---|---|---|
| 4,573,767 | * | 3/1986 | Jewell ................................. 350/354 |
| 5,007,061 | * | 4/1991 | Odagawa .............................. 372/25 |

FOREIGN PATENT DOCUMENTS

| | | | |
|---|---|---|---|
| 59116625-A | * | 7/1984 | (JP) ................................. G01J/1/00 |
| 63128319 | * | 5/1988 | (JP) ................................. G02F/1/35 |
| 06/110093 | * | 4/1994 | (JP) . |
| 06310797-A | * | 4/1994 | (JP) ................................. H01S/3/133 |

OTHER PUBLICATIONS

Paradisi, "Performance Analysis of an all-optical gate using a Multisectiont ravelling wave amplifier", IEE Proceedings–J, vol. 139, No. 1, Feb. 19992, pp. 42–49.*

* cited by examiner

Primary Examiner—Thomas H. Tarcza
Assistant Examiner—Deandra Hughes
(74) Attorney, Agent, or Firm—Arthur H. Tischer; Freddie M. Bush; Hay Kyung Chang

(57) ABSTRACT

The all-optical pulse generating and amplifying system utilizes a phosphor that is excited by input light of a first wavelength and, in response, emits light of a second wavelength. The light emitted by the phosphor illuminates a bistable element which, at a pre-fixed intensity of the phosphor-emitted light, switches from non-transmissive state to transmissive state, thereby allowing the exit of light (also of first wavelength) emitted by an output light source as light pulse output of the system. An inhibitory light that also passes through the bistable element during its transmissive state quenches the phosphor light emission and returns the bistable element to its non-transmissive state and re-starts the process toward the next transmissive state. By gating the intensity, via selected non-linearity of the bistable element, of the light output in proportion to the intensity of the input light, the system can also function as an amplifier.

5 Claims, 1 Drawing Sheet

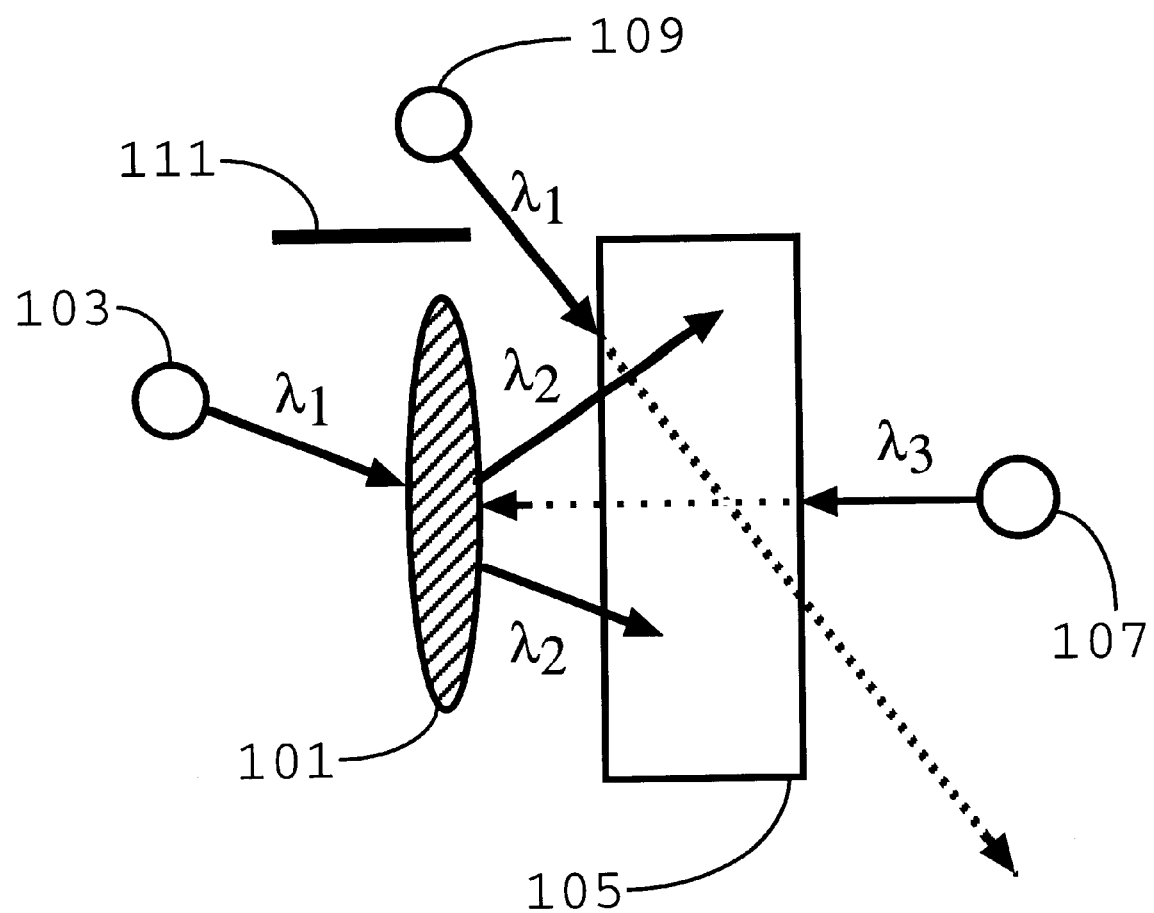

ALL-OPTICAL PULSE GENERATING AND AMPLIFYING SYSTEM

DEDICATORY CLAUSE

The invention described herein may be manufactured, used and licensed by or for the Government for governmental purposes without the payment to us of any royalties thereon.

BACKGROUND OF THE INVENTION

The spatio-temporal dynamics of non-linear systems includes many examples of chaotic behavior interspersed with regular rhythmic activity. A simple system of this type is a pair of coupled oscillators in which one oscillator, itself driven by an external source, excites the second oscillator which, in turn, attempts to inhibit the first oscillator. The competitive interaction can generate a rhythmic behavior which, at one extreme, is a variable-rate train of sharp spike-like pulses and, at the other extreme, is a quasi steady-state balance that may be used for amplification of the original input signal emitted by the external source. The two extremes of the rhythmic behavior are reached by varying the temporal response and the nonlinearity of response in the two coupled oscillators.

An example of a system for generating a series of pulses is a biological neuron which may be called an integrate-and-fire pulse generator. The neuron is usually modeled as a leaky capacitor which shorts out when its voltage reaches a critical fixed threshold, then, after the burst of current (i.e. the pulse), self-repairs the short and begins to recharge. The self-repair effect is also seen in an oil-filled capacitor. The time period between pulses depends on the strength of the externally-applied charging input. The integrate-and-fire mechanism has been implemented in many electronic designs.

Optical non-linear systems are more difficult to fabricate because of two fundamental facts. First, light intensity is a positive-definite physical quantity. Unlike electronic voltage which can be either positive or negative, light intensity can only be positive or zero. Second, photons can be created and destroyed at will in optical systems whereas electrons are conserved in electronic systems. The nonlinear optical effects in materials are primarily due to the dependence of the electrical susceptibility on the electric field of the incident optical wave. For instance, zeroth order gives birefringence, first order gives photoelectrons and third order exhibits photorefractive effects.

Hence, prior art methods of generating pulses of light required the use of a hybrid system that combined some electronics and some optics.

SUMMARY OF THE INVENTION

In the all-optical pulse generating and amplifying system, a phosphor is excited by input light of a first wavelength and, in response, emits light of a second wavelength. The light emitted by the phosphor illuminates a bistable element until, at a pre-fixed intensity of the phosphor-emitted light, the bistable element reversibly switches from non-transmissive state to transmissive state. This allows the exit of the light (also of first wavelength) that is emitted by an output light source as light pulse output of the system. An inhibitory light also passes through the bistable element during its transmissive state and quenches the phosphor light emission, thereby resulting in the return of the bistable element to its non-transmissive state and re-starting the process toward the next transmissive state. By gating the intensity (via selected non-linearity of the bistable element) of the light output in proportion to the intensity of the input light, the system can also function as an amplifier.

DESCRIPTION OF THE DRAWING

The single FIGURE depicts a preferred embodiment of the all-optical pulse generating and amplifying system.

DESCRIPTION OF THE PREFERRED EMBODIMENT

Referring now to the FIGURE wherein like numbers represent like parts, the solid allows in the FIGURE indicate the light paths that are always available and unblocked in the all-optical pulse generating and amplifying system (hereinafter referred to as the "system") and the dotted arrows show the light paths that become available only intermittently through bistable element 105. In addition, the system is comprised of input light source 103 which emits radiation of $\lambda_1$ that is incident on phosphor 101. The phosphor, which is susceptible to being quenched by radiation of $\lambda_3$ emanating from infrared (IR) source 107, responds to being excited by $\lambda_1$ by producing radiation of $\lambda_2$. $\lambda_2$, thusly produced, is transmitted toward bistable element 105 that is positioned between the phosphor and the IR source. The bistable element, which may be a commercially available non-linear interference filter, reversibly switches from a non-transmissive state to a transmissive state at a pre-fixed light intensity threshold, $I_0$, of $\lambda_2$. During its transmissive state, bistable element 105 is capable of fully transmitting both $\lambda_1$ and $\lambda_3$. The $I_0$ is determined by factors such as dopants, impurities and the method of preparation and manufacture of the bistable element and the abruptness of the switch from one state to another can be controlled by the choice of the design parameters of the bistable element to vary from a gradual non-linearity to a step function such as a hyperbolic tangent function with a very high gain.

Output light source 109, emitting $\lambda_1$, is always on but its light is prevented by bistable element 105 from exiting the system as output light pulse of the system except during the intermittent transmissive state of the element. Further, $\lambda_1$ from output light source 109 is prevented by baffle 111 from impinging on phosphor source's reduction of the phosphor output. For a given excitatory beam strength, this competion causes a balance to be reached at a point that varies with the strength of the excitatory beam. It follows, then, that the system's output pulse intensity is the product of the transmission of the bistable element and output source 109. Since the transmission is controlled by the excitatory input to the phosphor and the output light source strength can be set very high, the net output of the system is an amplified version of the excitatory input from input light source 103.

The all-optical pulse generating and amplifying system, as described above, is analogous to a biological neuron with an integrate-and-fire pulse generator. Its inhibitory channel is functionally the same as the biological synaptic shunting input channel. As such, the system can be modified so as to be fully equivalent to a compartmental model of a neuron with multiple dendritic compartments and a somatic compartment. Further, the amplifying capability of the system enables it to perform the same function as an electronic transistor. As is clear, the system has no electronic components and requires no electrical power Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto. 101. When radiation of $\lambda_1$ from input light source 103 illuminates phosphor 101, the phosphor outputs light of $\lambda_2$ which, in turn, illuminates bistable element 105. As the output light from the phosphor rises toward its steady-state value, its intensity on the bistable element at some point exceeds the pre-fixed threshold, $I_0$. At that point, the bistable element switches into its transmissive state. During this transmissive state, light of $\lambda_3$ from IR source 107 is allowed to pass through the bistable element and reach the phosphor where the light immediately quenches the phosphor output. When this occurs, the intensity of the output from the phosphor drops below the threshold $I_0$ which, in turn, causes the bistable element to switch back to its non-transmissive state. In its non-transmissive state, the bistable element blocks the inhibitory light of $\lambda_3$ from the IR source, thus allowing the phosphor to begin emitting again at $\lambda_2$, thereby repeating the previously-described process. The time lapse between the periodic gatings of the bistable element depends on the strength of the radiation from input light source 103.

The light from output light source 109 passes through the bistable element during its periodically-occurring transmissive state and exits the system as a pulse of light which is of the same duration and of the same repetition rate as the element's transmissive state. Additionally, since the pulse output of the system thus transmitted through the element is of $\lambda_1$, it can be used an an input to other, similarly-built optical pulse generators.

The amplifying function of the system depends on the degree of non-linearity of bistable element 105. If the non-linearity is gradual, then the amount of inhibitory light from IR source 107 that is incident on phosphor varies gradually and the output ($\lambda_2$) from the phosphor reaches an adiabatic balance between the effects of the inhibitory quenching intensity and the excitatory input intensity. This controls the degree of transmissivity of the bistable element. Essentially, there is a competition between the phosphor's excitation of the IR source-bistable element pair by increasing the transmissivity of the bistable element and the IR

We claim:

1. An all-optical pulse generating and amplifying system, said system comprising: a phosphor; a first light source emitting radiation of a first wavelength and of variable intensity, said first light source being positioned to illuminate said phosphor, thereby exciting said phosphor to emit radiation of a second wavelength; a second light source emitting radiation of a third wavelength; a bistable element, said element being located between said phosphor and said second light source, and being susceptible to alternating between transmissive state and non-transmissive state in response to radiation from said phosphor; and a third light source emitting radiation of a first wavelength, said third source being positioned so as to enable the transmission of its radiation of a first wavelength through said bistable element during the transmissive state of said bistable element as output of said system.

2. An all-optical pulse generating and amplifying system as described in claim 1, wherein said third light source is continuously on.

3. An all-optical pulse generating and amplifying system as described in claim 2, wherein said system further comprises a barrier, said barrier being placed between said phosphor and said third light source to shield said phosphor from radiation emanating from said third source.

4. An all-optical pulse generating and amplifying system as described in claim 3, wherein said bistable element reversibly switches from non-transmissive state to transmissive state at a pre-fixed intensity of radiation of said second wavelength.

5. An all-optical pulse generating and amplifying system as described in claim 4, wherein said bistable element transmits therethrough during its transmissive state radiation of both said first wavelength and said third wavelength.

* * * * *